3,297,695
ANTHRAQUINONE DYES AND THEIR
PRODUCTION
Hans Weidinger and Gerhard Wellenreuther, Limburgerhof, Pfalz, and Reinhold Krallmann, Ludwigshafen (Rhine), Germany, assignors to Badische Anilin- & Soda-Fabrik Aktiengesellschaft, Ludwigshafen (Rhine), Germany
No Drawing. Filed Feb. 26, 1965, Ser. No. 435,715
Claims priority, application Germany, Mar. 5, 1964, B 75,728
5 Claims. (Cl. 260—247.5)

The present invention relates to new blue dyes having the general formula:

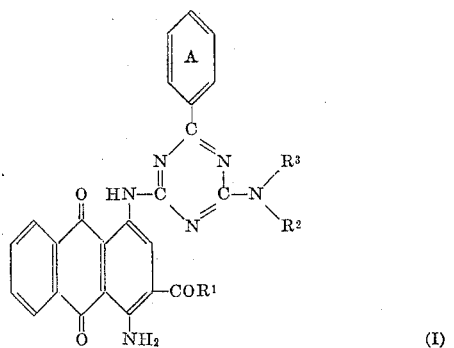

in which the radical $R^1$ denotes an alkyl, aryl or alkoxyl group or an amino group bearing one or two hydroxyalkyl or alkoxylalkyl radicals as substituents; the radical $R^2$ denotes a hydrogen atom, an alkyl group, an alkoxyalkyl group or a hydroxyalkyl group; the radical $R^3$ denotes a hydrogen atom, an alkyl group, an alkoxyalkyl group or a hydroxyalkyl group or $R^2$ and $R^3$ together with the amino nitrogen atom may be common members of a heterocyclic ring and the ring A may bear halogen atoms, alkyl groups, alkoxy groups, hydroxyl groups, carbomethoxy groups, alkylsulfone groups or substituted sulfonamide groups as substituents. The invention also relates to a method of preparing the said dyes.

The new dyes are eminently suitable for dyeing and printing linear polyester and polyamide materials. They have high substantivity for textile materials of the said substances and fulfil the requirements as regards extremely high thermal fastness properties.

The new dyes are obtained when azine chlorides having the general formula

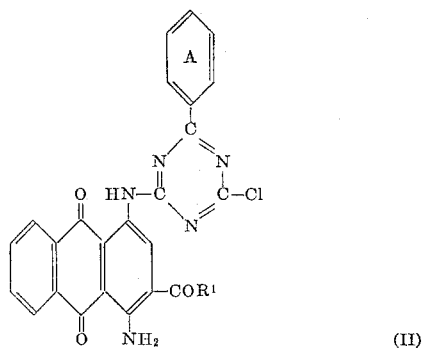

in which the radical $R^1$ and the ring A have the above meanings are reacted by a conventional method with ammonia or a primary or secondary amine having the general formula:

in which the radicals $R^2$ and $R^3$ have the above meanings.

The azine chlorides having the general Formula II to be used as initial materials are known from German patent specification No. 1,073,130 and may be obtained by the general method of production given in the said patent specification from a phenyldichlorotriazine and a 1,4-diaminoanthraquinone derivative which bears an acyl radical in 2-position.

The phenyldichlorotriazines may bear halogen atoms, hydroxyl groups, alkyl groups, such as methyl groups or ethyl groups, alkoxy groups, such as methoxyl groups, carbomethoxy groups or substituted sulfonamide groups, such as dimethylsulfonamide or di-(hydroxyethyl)-sulfonamide groups, in the phenyl radical. Examples of 1,4-diaminoanthraquinone derivatives which bear an acyl radical in 2-position are those having the acyl radicals —$COCH_3$, —$COC_2H_5$,

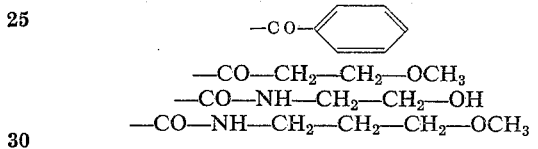

—CO—$CH_2$—$CH_2$—$OCH_3$
—CO—NH—$CH_2$—$CH_2$—OH
—CO—NH—$CH_2$—$CH_2$—$CH_2$—$OCH_3$
and —CO—N($CH_2$—$CH_2$—OH)$_2$.

The following compounds are given as examples of amines having the general Formula III:

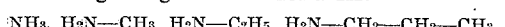
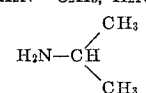
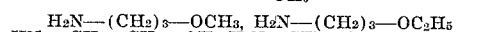
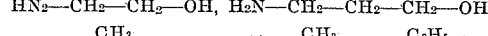
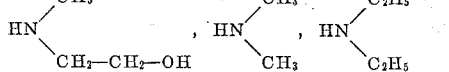
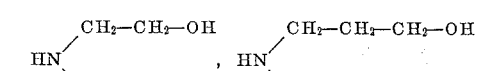
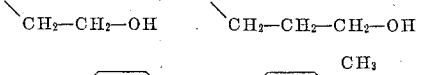
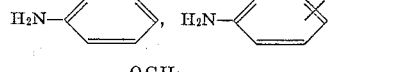
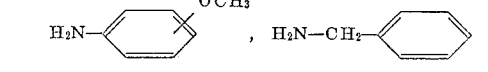
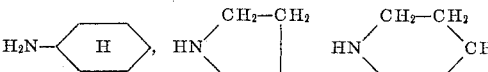
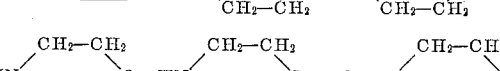
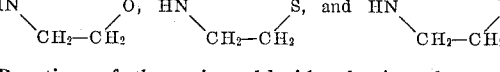

Reaction of the azine chlorides having the general Formula II with amines having the general Formula III is advantageously carried out in an inert organic solvent at 50° to 250° C., preferably at 80° to 150° C. Examples of suitable solvents are o-dichlorobenzene, trichlorobenzene, nitrobenzene and N-methylpyrrolidone. It is advantageous to use a large excess of amine, for example 2 moles of amine to 1 mole of azine chloride, in order to bind the hydrogen chloride formed; the reaction may also take place in the amine as solvent. It is also possible to add separately a tertiary amine, for example triethylamine, or a sterically hindered secondary amine, for example diisopropylamine, to bind the liberated hydrogen chloride.

Dyes according to this invention dye materials, such as textile materials, of linear polyesters either by the high temperature method or by the thermosol method, and of polyamide, advantageously in the presence of small amounts of a carrier, for example a product obtainable by reaction of 1 mole of castor oil with 40 moles of ethylene oxide, in blue shades having high fastness properties. These dyeings are distinguished by good light fastness and wash fastness and by extremely high heat setting fastness.

The following examples will further illustrate the invention. The parts specified in the examples are parts by weight.

*Example 1*

A mixture of 23.5 parts of 2-chloro-4-phenyl-6-[1-amino-2-acetylanthraquinonyl-(4)] - aminotriazine - (1,3,5), 10.5 parts of diethanolamine and 100 parts of nitrobenzene is stirred for five hours at 150° C. The reaction mixture is cooled to 100° C. and the nitrobenzene is distilled off with steam. The resultant precipitate is suction filtered, washed with water and dried. 23 parts of the dye having the formula:

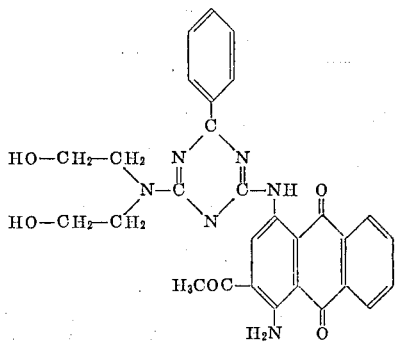

is obtained; it dyes polyester textile material fast blue shades by the high temperature method (135° C., acetic acid).

*Example 2*

23.5 parts of 2-chloro-4-m-tolyl-6-[1-amino-2-acetyl-anthraquinonyl-(4)]-aminotriazine-(1,3,5) is reacted in 200 parts of nitrobenzene with 10 parts of γ-methoxypropylamine as described in Example 1. The product is dried. 23 parts of the dye having the formula:

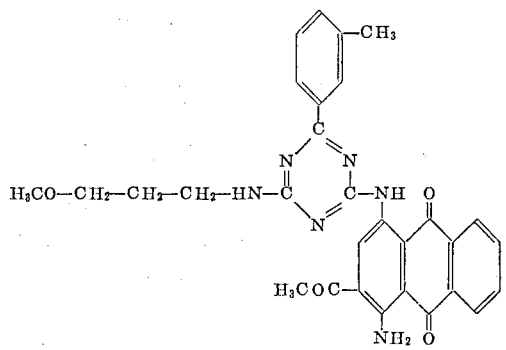

is obtained; it dyes polyester textile material fast blue shades by the thermosol method.

*Example 3*

23.5 parts of 2-chloro-4-phenyl-6-[1-amino-2-acetyl-anthraquinonyl-(4)]-aminotriazine-(1,3,5) is reacted in 300 parts of nitrobenzene with 9 parts of morpholine for three hours at 150° C. The reaction mixture is processed as described in Example 1, and dried. 26 parts of the dye having the formula:

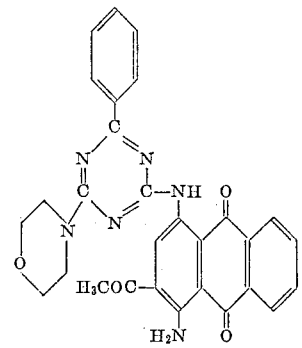

is obtained which dyes polyester textile material fast blue shades by the thermosol method.

*Example 4*

A mixture of 10 parts of 2-chloro-4-phenyl-6-[1-amino-2 - carbomethoxyanthraquinonyl - (4)] - aminotriazine-(1,3,5), 6 parts of diethanolamine and 70 parts of nitrobenzene is stirred for three hours at 150° C. The nitrobenzene is distilled off with steam, and the dye is suction filtered, washed with methanol and dried. 9 parts of the dye having the formula:

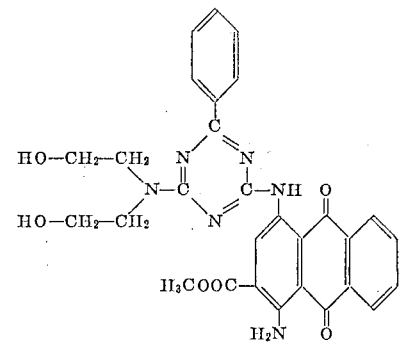

is obtained; it dyes polyamide textile material fast blue shades.

*Example 5*

A mixture of 23.5 parts of 2-chloro-4-phenyl-6-[1-amino-2-acetylanthraquinonyl - (4)] - aminotriazine - (1,3,5), 12 parts of diethanolamine and 100 parts of nitrobenzene is heated for five hours at 80° C. The reaction mixture is worked up as described in Example 1. 23 parts of the dye described in Example 1 is obtained.

We claim:
1. A dye having the formula

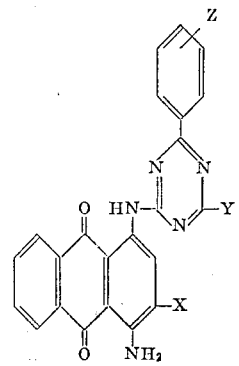

wherein X is a member selected from the group consisting of —COCH₃, —COOCH₃, —COC₂H₅,

—CO—CH₂—CH₂—OCH₃
—CO—NH—CH₂—CH₂—OH
—CO—NH—CH₂—CH₂—CH₂—OCH₃
—CO—N(CH₂—CH₂—OH)₂ and

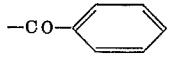

Z is a member selected from the group consisting of hydrogen, halogen, methyl, ethyl, methoxyl, carbomethyl, dimethylsulfonamido and di-(hydroxyethyl)-sulfonamido and Y is a member selected from the group consisting of —NH₂, —HN—CH₃, —HN—C₂H₅,

—HN—CH₂—CH₂—CH₃

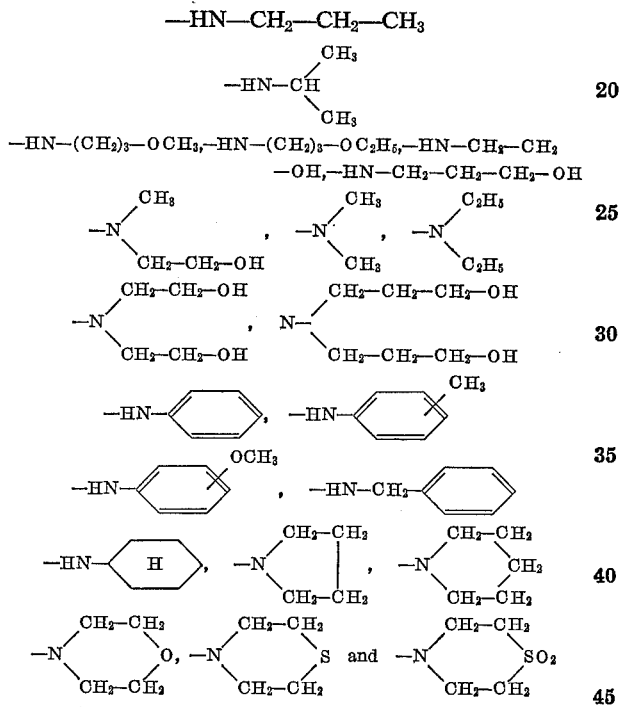

2. The dye having the formula

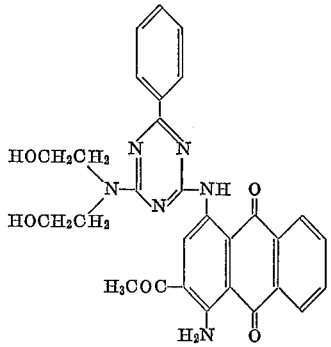

3. The dye having the formula

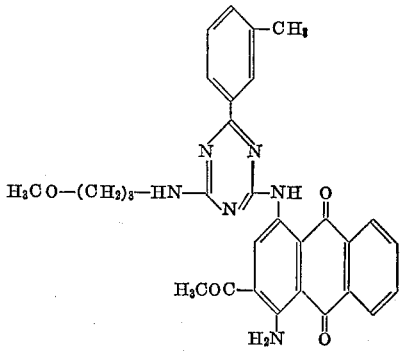

4. The dye having the formula

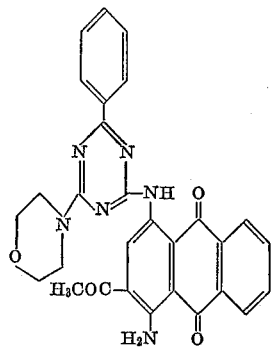

5. The dye having the formula

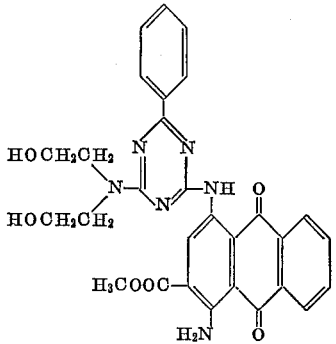

References Cited by the Examiner
UNITED STATES PATENTS
1,437,783   12/1922   Steinbach et al. _____ 260—249
3,079,389   2/1963   Kern et al. _____ 260—249

WALTER A. MODANCE, Primary Examiner.
JOHN M. FORD, Assistant Examiner.